(12) United States Patent
Merle et al.

(10) Patent No.: US 8,865,798 B2
(45) Date of Patent: Oct. 21, 2014

(54) SELF HEALING COMPOSITE MATERIAL AND METHOD OF MANUFACTURING SAME

(75) Inventors: Philippe Merle, Pincourt (CA); Yoann Guntzburger, Montréal (CA); Émile Haddad, Montréal (CA); Suong Van Hoa, Brossard (CA); Girish Thatte, Montréal (CA)

(73) Assignees: Valorbec Societe en Commandite, Montreal (CA); MPB Communications Inc., Pointe-Claire (CA)

( * ) Notice: Subject to any disclaimer, the term of this patent is extended or adjusted under 35 U.S.C. 154(b) by 1178 days.

(21) Appl. No.: 11/873,950

(22) Filed: Oct. 17, 2007

(65) Prior Publication Data
US 2009/0036568 A1 Feb. 5, 2009

Related U.S. Application Data

(60) Provisional application No. 60/829,689, filed on Oct. 17, 2006, provisional application No. 60/871,782, filed on Dec. 23, 2006.

(51) Int. Cl.
*C08K 9/00* (2006.01)

(52) U.S. Cl.
USPC ........... 523/206; 523/200; 523/205; 428/402; 428/402.2

(58) Field of Classification Search
USPC ............... 523/200, 205–206; 428/402, 402.2
See application file for complete search history.

(56) References Cited

U.S. PATENT DOCUMENTS

| | | | |
|---|---|---|---|
| 3,859,228 A * | 1/1975 | Morishita et al. | 427/213.36 |
| 3,870,542 A * | 3/1975 | Ida et al. | 427/189 |
| 4,324,717 A * | 4/1982 | Layer | 524/244 |
| 4,463,118 A * | 7/1984 | Evans et al. | 524/264 |
| 5,071,706 A * | 12/1991 | Soper | 428/402.2 |
| 6,518,330 B2 * | 2/2003 | Sottos et al. | 523/200 |
| 6,858,659 B2 * | 2/2005 | White et al. | 523/200 |

OTHER PUBLICATIONS

"Occupational Safety and Health Guideline for Ethylidene Norbornene." US Department of Heatlh and Human Services, 1995, pp. 1-8.*
"3 M Fluorinert Liquids." pp. 1-4, Issued 2000.*
Lee et al. "Characterization of Dicyclopentadiene and 5-ethylidene-2-norbornene as Self-Healing Agents for Polymer Composite and its Microcapsules." Sep. 3, 2004, pp. 478-483.*
Solvents. O=CHem Directory. http://www.usm.maine.edu/~newtwon/chy251_253/LEctures/Solvents/solvents.html, pp. 1-4.*

* cited by examiner

*Primary Examiner* — Hannah Pak
(74) *Attorney, Agent, or Firm* — Bereskin & Parr LLP/S.E.N.C.R.L.,s.r.l.

(57) ABSTRACT

A self-healing material comprises a matrix embedded with micro-pockets of a healing-agent releasable by a crack in the matrix. The healing-agent is able to bond to the matrix to repair the crack. The healing-agent is contained in microcapsules. A corresponding catalyst for the healing-agent is embedded in the matrix and contained in a plurality of microcapsules as an emulsion. The emulsion comprises an oil, a perfluorated solvent, a hydrophobic ionic liquid, or mixtures thereof. A method of manufacturing the self-healing material comprises the steps of identifying an operational temperature range of the material, providing at least one substance as the healing-agent, which substance remaining substantially in a liquid state within the operational temperature range, identifying an operational evaporation rate of the healing-agent and providing the substance with a curing time according to the evaporation rate.

15 Claims, 14 Drawing Sheets

| Compound | Chemical formula | Melting point (° C) | Boiling Point (° C) | Cost (CAD$/L) |
|---|---|---|---|---|
| Dicyclopentadiene(DCPD) | $C_{10}H_{12}$ | 33-34 | 170 | ~70 |
| 5-ethylidene-2-norbornene (5E2N) | $C_9H_{12}$ | -80 | 146 | ~ 85 |
| 1,5-cyclooctadiene (COD) | $C_8H_{12}$ | -69 | 150 | ~ 75 |
| Methylcyclopentadiene dimmer (MCPD) | $C_{12}H_{16}$ | -51 | 70-80 | ~ 60 |
| 5-vinyl-2-norbornene (5V2N) | $C_9H_{12}$ | -80 | 141 | ~ 160 |

Fig. 6

SELF HEALING COMPOSITE MATERIAL AND METHOD OF MANUFACTURING SAME

The present invention was made under the terms of a research agreement entered by MPB Communications Inc., located at 151 Hymus Blvd., Pointe-Claire, Quebec, Canada, and Concordia University, located at 1455 de Maisonneuve Blvd West Gm-1000, Montreal, Quebec, Canada, on Mar. 11, 2005.

FIELD OF THE INVENTION

The present invention generally relates to the field of materials, including composite materials. More specifically, the invention relates to a novel material capable of repairing itself when cracked.

BACKGROUND OF THE INVENTION

For communication and exploration purposes, many structures are placed in outer space. These can be in the form of a space station, a space vehicle or satellites. From the time of deployment to the operating conditions, these structures are subjected to different adverse loadings. These include the stresses and vibrations during launch, extreme fluctuations of temperature from −150° C. to +150° C. (depending on whether the structure is facing the sun or not), impact of space dusts such as atomic oxygens, micro-meteorites, hard vacuum environment, etc. Under these loading conditions cracks and punctures may be formed in these structures. These structures are very expensive to produce and to deploy. It is therefore very important to ensure that their operational life is as long as possible. If cracks are created in these structures, due to their remote locations, it is expensive and impractical to send service people to do repair. If the structure can repair itself after being subjected to loadings that produce cracks the life of the structure can be prolonged.

Due to their light weight, high stiffness and high strength, polymer matrix composite materials have been used to make many parts of space structures, aircraft, as well as a wide range of high performance products including tennis racquets and other sporting goods. While in aircraft, the operating range may vary roughly from −60° C. to +50° C., in other applications for high performance composite materials, the operating temperature range may be vast. Polymer composite materials consist mainly of strong and hard fibers such as carbon, glass and aramid fibers, and resin matrix such as epoxy resins. Fibers are resistant and may not break easily. However the resin matrix may crack more easily.

There has been development of self-healing of epoxy matrix resin for general purpose applications. This has been described in U.S. Pat. No. 6,518,330 to White et al and U.S. Pat. No. 6,858,659 to White et al. These patents teach a material that is self-healed by thermal treatment above the normal operating temperature of the material, namely the material is taken out of its operating environment, raised to a temperature above 33° C. at which the monomer flows into any cracks and polymerizes, and then cooled down to the normal operating temperature.

Another approach for healing of polymeric resins is to incorporate hollow fibers into the matrix resin. (Semprimoschnig C., "Enabling self-healing capability—a small step to bio-mimetic materials", Materials Report number 4476, European Space Agency, Jan. 12, 2006). In this approach, hollow glass fibers are embedded in the polymer matrix materials. Semprimoschnig C. et al., used a two-part healing materials infused in separate hollow fibers. When a crack occurs, it breaks the hollow fibers, and the two-part healing materials flow out to fill the cavity of the crack. The reaction requires external heating (2 hours at 100° C.) to enable a complete curing. Also the healing efficiency is not high.

SUMMARY OF THE INVENTION

Removing a device using a self-healing material from regular service for "healing" is a drawback of the existing technology. It is an object of the present invention to provide a self-healing composite material that allows for the healing process to take place while the device is in its normal operating temperature range.

In accordance with an embodiment of the present invention, there is provided a self-healing material comprising a matrix embedded with micro-pockets of a healing-agent. The healing-agent is releasable by a crack in the matrix and is able to bond to the matrix to repair the crack.

Preferably, the healing-agent has a boiling point above 130° C. More preferably, the healing-agent has a melting point below −50° C. Still more preferably, the healing-agent has a boiling point above 144° C.

According to a particularly preferred embodiment, the invention relates to a self-healing material comprising a matrix of at least one polymer material, wherein a first set of microcapsules and a second set of microcapsules are uniformly distributed and embedded in the matrix;

each microcapsule of the first set of microcapsules contains a liquid healing-agent;

each microcapsule of the second set of microcapsules comprises a liquid selected from the group consisting of an oil, a perfluorated solvent, a hydrophobic ionic liquid, and mixtures thereof, and a catalyst dissolved or dispersed in the liquid and allowing the polymerization of the healing agent;

being understood that when a crack is made in the matrix, at least one microcapsule of the first set of microcapsules and one microcapsule of the second set of microcapsules are broken to release and mix their content in the crack and thereby allow the polymerization of the healing agent <<in situ>> into a solid polymer that is bonded to the matrix and fills the crack to repair it.

Optionally, the healing-agent is contained in microcapsules and a corresponding catalyst for the healing-agent is embedded in the matrix. The healing-agent preferably is 5-ethylidene-2-norbornene. The matrix may be a polymer. The material may be a fiber reinforced composite material. Optionally, the catalyst is contained in a plurality of microcapsules. Preferably, the catalyst is dispersed in a polysiloxane with poly urea formaldehyde support.

Preferably, the healing-agent has a curing time of less than 10 minutes at 40° C. Optionally, a first set of the micro-pockets (preferably a first set of microcapsules) contain a first healing-agent having a lower melting point than the melting point of a second healing-agent contained in a second set of micro-pockets (preferably a third set of microcapsules).

In accordance with another embodiment of the present invention, there is provided a method of manufacturing a long service life self-healing material. The material comprises a matrix embedded with micro-pockets of a healing-agent which is releasable by a crack in the matrix and is able to bond to the matrix to repair the crack. The method comprises the steps of 1) identifying an operational temperature range of the material; 2) providing at least one substance as the healing-agent. This substance must remain substantially in a liquid state within the operational temperature range; 3) identifying an operational evaporation rate of the healing-agent; 4) providing the at least one substance with a curing time according to the evaporation rate and; 5) using the substance as the healing-agent in the production of the material.

Preferably, the healing-agent boils only above the operational temperature range, but is solid at a lower end of the range. The healing takes place within majority of time of operation. Such a material may be used in satellite spacecrafts, where the operational temperature range of the material is from −150° C. to 150° C.

Preferably, the healing-agent is 5-ethylidene-2-norbornene contained in microcapsules. The corresponding catalyst for the healing-agent is embedded in the matrix. The matrix may be a polymer and the material may be a fiber reinforced composite material.

In accordance with yet another embodiment of the present invention, there is provided a telecommunications system comprising a satellite. The satellite has a power source, a telecommunications antenna and on-board telecommunications and control electronics, and at least one frame or structural member made of a self-healing material. The self-healing material comprises a matrix embedded with micropockets of a healing-agent releasable by a crack in the matrix and able to bond to the matrix to repair the crack. The material is then operative to perform self-healing at least daily in space orbit. The telecommunication system further comprises at least one ground station in communication with the satellite.

Preferably, the healing-agent is operative to heal the material within a majority of time of operation of the satellite. More preferably, the healing-agent is 5-ethylidene-2-norbornene contained in microcapsules. A corresponding catalyst for the healing-agent is embedded in the matrix. The matrix may be a polymer and the material may be a fiber reinforced composite material. Preferably, the healing-agent has a curing time of less than 10 minutes at 40° C. More preferably, the material has an operational temperature range from −150° C. to 150° C. Most preferably, the healing-agent has a curing time sufficiently quick to substantially avoid its evaporation.

It will be appreciated that micropockets may be cavities in the matrix. These micropockets may contain the healing-agent directly. Alternatively, the micropocket contains or defines a microcapsule that contains the healing-agent, thereby separating the healing-agent from the matrix material by a shell. Therefore, the micropocket may both contain a healing-agent directly or indirectly, depending on the nature of the healing-agent and the matrix.

Advantageously, the invention provides a self-healing material system operating over a wider temperature range than existing systems. Consequently, this provides a larger "healing" operating range for the material itself. Furthermore, the new self-healing material system provides faster healing rate than the currently known systems. The healing rate of the present invention meets the required healing rate for applications in space environment. The new self-healing material system also provides high healing efficiency. Moreover, the self-healing material system of the present invention is less toxic than the monomer usually used in the prior art. Additionally, a better homogeneity of the material results from the concomitant use of both monomer and catalyst microcapsules.

In accordance with yet another embodiment of the present invention, there is provided a method of encapsulating a compound into a plurality of microcapsules, the method comprising:

preparing an aqueous solution comprising at least one monomer adapted to generate a microcapsule, and having a predetermined pH;

substantially eliminating surface bubbles;

agitating said solution at a predetermined speed so as to obtain a desired diameter for said microcapsules;

adding said catalyst to be encapsulated into said microcapsules;

optionally adding another monomer adapted to copolymerize with said monomer previously added, thereby obtaining microcapsules containing said catalyst and adapted to be embedded into a matrix. Preferably, the catalyst is added as a suspension or dispersion in a liquid selected from the group consisting of an oil, a perfluorated solvent, a hydrophilic ionic liquid, and mixtures thereof.

The aqueous solution may be an aqueous solution comprising an ethylene maleic anhydride copolymer. The aqueous solution may further comprise ammonium chloride and/or resorcinol. For example, the predetermined pH can about 2 to 4, or 2.6 to 3.5. A surfactant can be added so as to substantially eliminate surface bubbles. Suitable surfactants are, for example, $C_6$-$C_{12}$ alcohols (such as octanol, and more particularly 1-octanol), a low molecular weight silicone (such as a polydimethylsilicone oil (PDMS)). The monomer can be for example urea and the other monomer can be for example formaldehyde. The catalyst can be a catalyst adapted to catalyze a ring opening metathesis polymerization reaction.

BRIEF DESCRIPTION OF DRAWINGS

These and other features of the present invention will become more apparent from the following description in which reference is made to the appended drawings wherein:

FIG. 6 is a table of properties of different monomers in accordance with an embodiment of the present invention;

DETAILED DESCRIPTION OF PREFERRED EMBODIMENTS OF THE INVENTION

Figure 1:
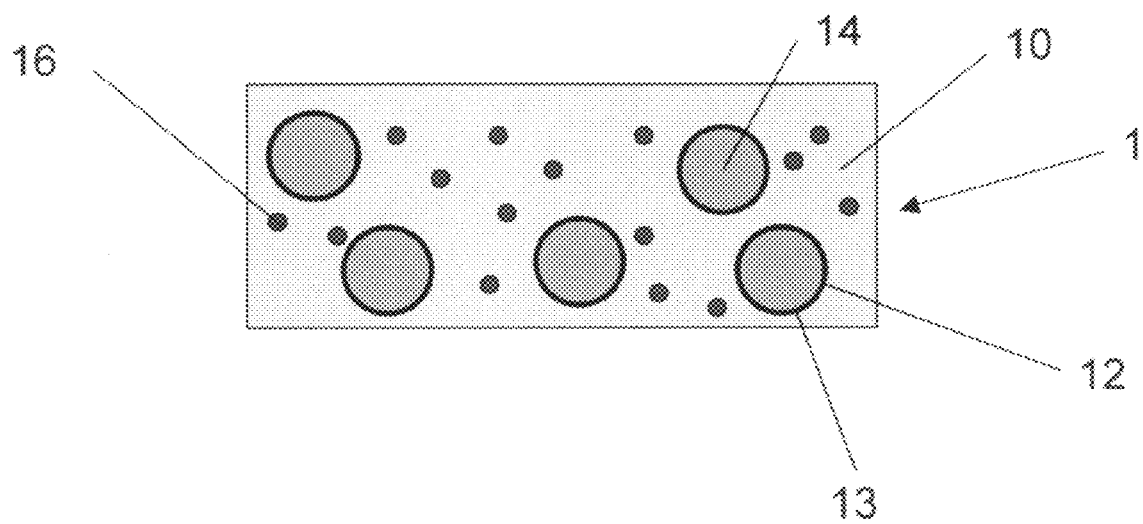
FIG. 1 is a schematic view of the composite material system in accordance with an embodiment of the present invention.

FIG. 1 illustrates an embodiment of a self-healing composite material 1 of the present invention. The composite material is made of a matrix 10, or polymer, in which is distributed a plurality of microcapsules 12. The resin matrix 10 can be epoxy resin. The resin matrix 10 is usually used as the matrix for bonding the long continuous fibers in composite materials. The microcapsules 12 contain a polymerizable healing-agent 14. A shell 13 of the microcapsule 12 is designed to be sufficiently rigid so that it does not break easily and can contain the healing-agent 14. At the same time, the shell 13 should be sufficiently adhered to the matrix 10 and easy to break such that a crack crossing the matrix 10 breaks the shell 13 and frees the healing-agent 14, which flows out to be in contact with a catalyst 16 contained in the matrix 10. The catalyst 16 corresponds to the polymerizable healing-agent 14 or, in other words, the corresponding catalyst 16 is capable of polymerizing the healing-agent 14. The healing-agent 14 contains a polymerizable compound such as a monomer or prepolymer, and may optionally contain other ingredients, such as other monomers and/or prepolymers, stabilizers, solvents, viscosity modifiers such as polymers, odorants, colorant and dyes, blowing agents, antioxidants, and co-catalysts. The healing-agent 14 is capable of being liquefied.

Figure 2:
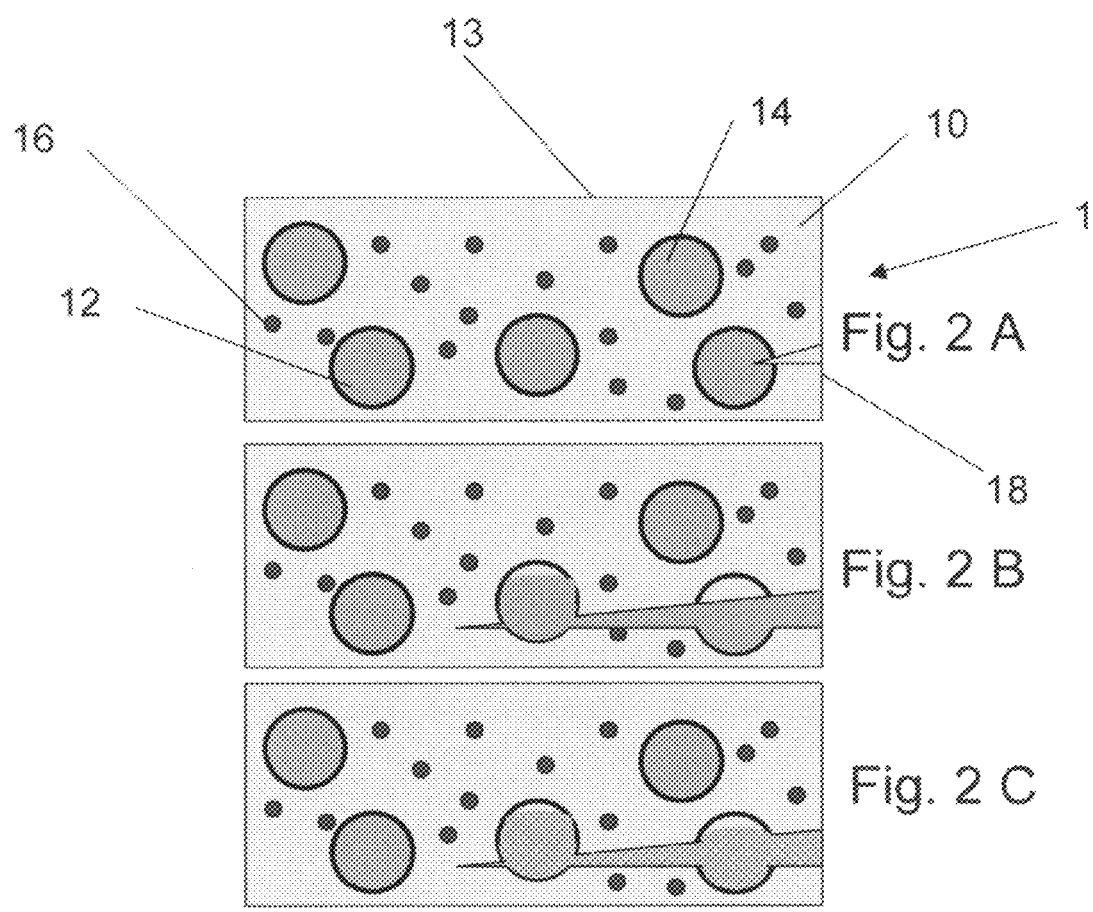
FIG. 2a to 2c are schematic views of a sequence of events of the self-healing process of the composite material of FIG. 1.

FIG. 2a to 2c shows a sequence of events occurring when the composite material 1 gets damaged. FIG. 2a shows an approaching crack 18. In FIG. 2b, the approaching crack 18 ruptures the shells 13 of the embedded microcapsules 12, releasing the healing-agent 14, in liquid form, into the crack plane through capillary action. Polymerization of the healing-agent 14, in FIG. 2c is triggered by contact with the catalyst 16. This step bonds the crack faces. The crack 18 is then filed with a material compatible with the material of the matrix 10. This reduces stress concentration at the tip of the crack 18 and provides the so-called "self-healing" effect of the material. Advantageously, the damage-induced triggering mechanism provides area-specific autonomic control of the repair.

The selection of a healing-agent 14 depends upon many factors such as its chemical and physical properties, compatibility with the other materials, suitability to space application, as for example the structural components of a telecommunications satellite. For the optimal healing process, the healing-agent 14 from the broken microcapsule 12 should flow easily into the crack plane by capillary action, covering the maximum crack area to give a better strength to the damaged site. Besides having free flowing property (i.e. low viscosity in the matrix), the healing-agent 14 will be selected to also fulfill as much as possible the following requirements, to be used as a healing material for space applications:

- Broad liquid temperature range
- Work with a catalyst that is efficient and compatible with the matrix material. In one embodiment, first generation Grubbs' catalyst was used for the polymerization reaction. With this catalyst only ring opening metathesis polymerization reaction (ROMP) is possible. As such the monomer healing-agent was chosen to be one that undergoes a ROMP reaction.
- Stable in air
- Relatively inexpensive
- Compatible with an encapsulation method with a long shelf life
- The resulting polymerization proceeds rapidly over wide temperature range
- The reaction is relatively insensitive to the monomer healing-agent:catalyst ratio. As microcapsules and catalyst are randomly distributed into the matrix material, it is uncertain to obtain specific monomer healing-agent:catalyst ratio for the polymerization reaction.

Considering the above factors, 5-ethylidene-2-norbornene (5E2N) was selected as the healing-agent 14 in the first embodiment. This monomer healing-agent has the following characteristics that make the composite material system suitable for space applications: The melting temperature of the 5E2N is $-80°$ C. and its boiling temperature is $146°$ C. As such, this monomer healing-agent has a much larger liquid range than conventional DCPD. 5E2N is less toxic than the DCPD monomer. The polymerization time of 5E2N is less than 1 minute at $40°$ C. This provides a fast healing rate, capable of meeting the request for space applications.

Figure 3:
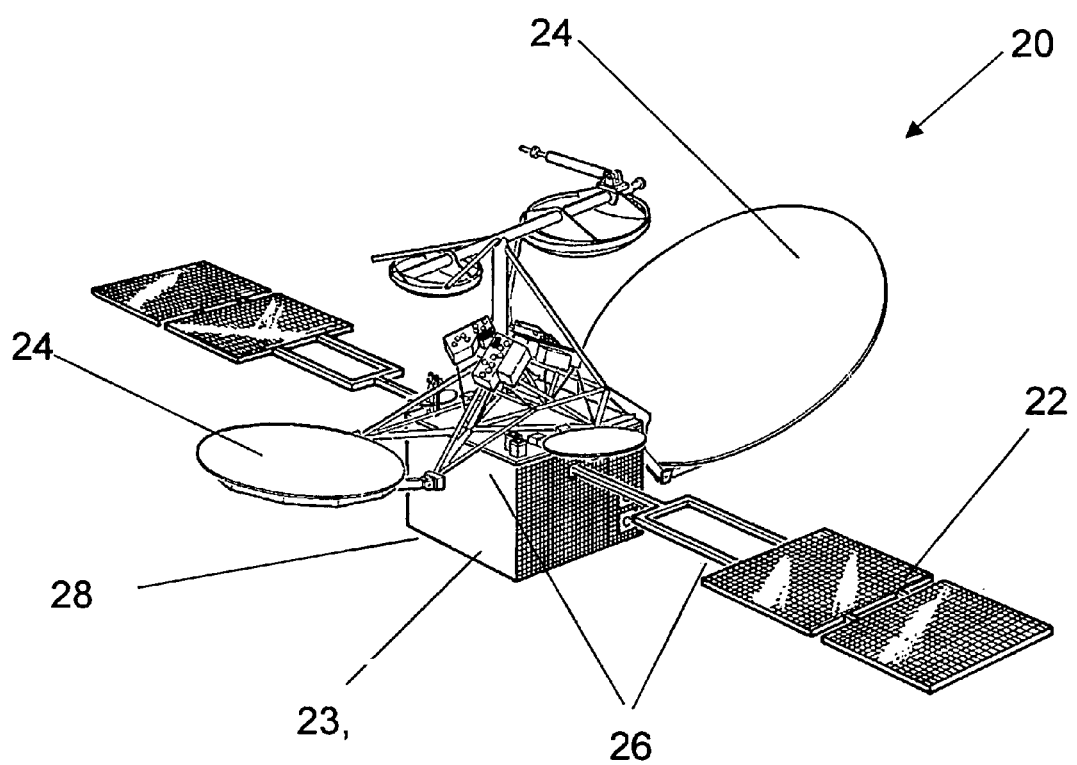
FIG. 3 is a perspective view of a satellite including components made of the composite material system in accordance with an embodiment of the present invention.

A satellite 20 is illustrated in FIG. 3. The satellite 20 supports solar panels 22, stabilizing motors or jets (not shown), a power regulator and storage unit 23, telecommunications antennas 24 and on-board telecommunications and control electronics. These components of the satellite 20 depend on the integrity of the frame 26 and housing 28 that interconnects them, and a structural failure can, and in severe cases will, lead to telecommunications failure. When space dust strikes the frame 26 and housing 28 made of conventional materials, the structural integrity is slowly compromised, and the estimated service life of the satellite 20 is reduced. By using the self-healing composite material 1 according to the invention, the service life of the satellite 20 is prolonged. The satellite 20 communicates with one or more ground stations on Earth. In an imaging satellite, radar imaging antenna or optical cameras are also provided. In a broadband telecommunications satellite, the antenna 24 may be provided with multiple horns for providing multiple spot beams on Earth.

While the invention has been described above with reference to a mechanism using monomer healing-agent contained in microcapsules 12 and catalyst 16 in the matrix 10 to provide the healing agent 14, it will be appreciated that other compositions may be suitable in certain applications. For example, a lacquer or other resin dissolved in a volatile solvent may be suitable in cases where the matrix 10 permits evaporation of the solvent While the invention has been described above with reference to a spacecraft, and more particularly to an application using the telecommunications satellite 20, it will be appreciated that the invention may be used in other applications where the normal operation of the material will not impede self-healing. For example, a crack in a fighter jet component caused by a projectile could be healed when the component is in flight, as long as the in-flight component stress deformation does not impede proper self-healing.

In a second embodiment of the invention, the catalyst 16 is also encapsulated in a of microcapsules 12. It has been found that the encapsulation of the catalyst 16, preferably in solid state, as a dispersion in a polysiloxane with poly urea formaldehyde while having a lower catalyst-to-monomer healing-agent loading (c.a. 0.1%) resulted into a more stable composite material 1. Furthermore, this concomitant use of both monomer healing-agent and catalyst microcapsules provided a better homogeneity of the composite material 1 than when the catalyst 16 is not encapsulated.

Figure 4:
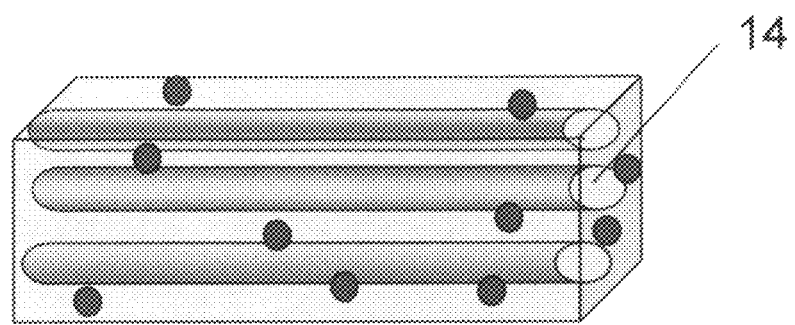
FIG. 4 is a schematic view of the composite material system including fibers filled with monomer liquid in accordance with an embodiment of the present invention.

In a third embodiment of the invention, shown in FIG. 4, the same healing-agent 14, 5E2N, is infused within hollow fibers 29 typically used in reinforced composite materials.

Although this provides an alternative solution to the microcapsules 12, the use of the microcapsules 12 is preferred.

Figure 5:
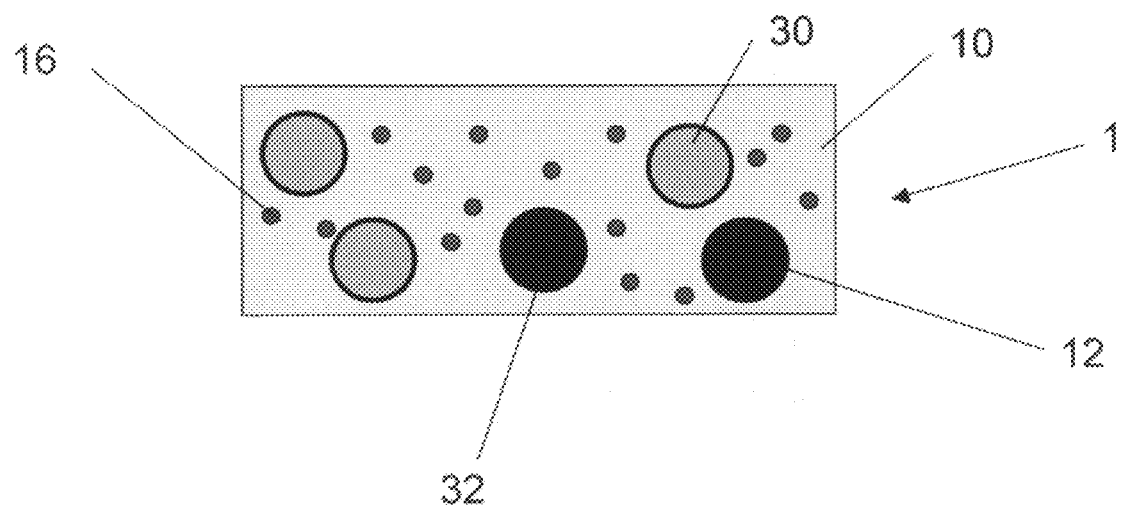
FIG. 5 is a schematic view of the composite material system including two different monomer microcapsules in accordance with an embodiment of the present invention.

FIG. 5 illustrates a fourth embodiment of the present invention. In this variation, two different types of healing-agents are used in the matrix 10. A low-temperature range healing-agent 30 and a high-temperature range healing-agent 32 are used. The low-temperature range healing-agent 30 has a lower melting point than the high-temperature range healing-agent 32. When a crack progresses in the matrix 10, microcapsules 12, containing one of the types of healing-agent 30 or 32, will eventually get broken. If, for instance, the ambient temperature is such that the high-temperature range healing-agent 32 is solid, it cannot flow out of its microcapsule 12. However, when the crack reaches a microcapsule 12 containing the low-temperature range healing-agent 30, the microcapsule 12 gets broken and the low-temperature range healing-agent 30 flows out to seal the crack 18 (not shown in this Figure). Similarly, if the ambient temperature is above the boiling temperature of the low-temperature range healing-agent 30 but within the liquid range of the high-temperature range healing-agent 32, the low-temperature range healing-agent 30 would vaporize when its microcapsule 12 gets broken by a crack 18 while the high-temperature range healing-agent 32 will flow out in liquid form to seal the crack 18. Since the vapor could interfere with the liquid performing self-healing, it is best that the low-range microcapsule shell 13 be made of a material that is brittle below the boiling point and elastic above the boiling point of the low-temperature range liquid, so that no rupture of the low-temperature range microcapsules causes vapor to be released. With an overlap of the liquid phase of both the low-temperature range healing-agent 30 and the high-temperature range healing agent 32, a vast operating temperature range of the self-healing material 1 can be provided.

FIG. 6 shows a table of properties of different monomers for potential use as a healing agent.

Microencapsulation.

The microencapsulation process is the suspension polymerization at the surface of organic droplets suspended in an aqueous phase. The size of the capsules ranges from one micron to seven millimeters depending upon many factors like stirring speed, core material, shell material, position of agitator etc.

Microencapsulation technique has wide application in industry. For example scratch and sniff perfume advertisement, carbonless copy paper, detergent industry, pharmaceutical industry, biomedical, agriculture, photography, printing, adhesives, agrochemicals, catalyst, flavor oils and vitamins all use microencapsulation.

Shell materials may be organic polymers, waxes and fats depending upon the application. The release of the core material from the capsule can be achieved by mechanical rupture of the capsule wall, diffusion of the core material through the wall, melting of the wall, dissolution of the wall, slow erosion of the wall (known as ablation) or biodegradation. The many advantages of the microencapsulation technique are:

The core substance can be protected from the deleterious effects of the surrounding environment.
Toxic material can be safely handled.
Delivery of the encapsulated material may be controlled and targeted.
Liquid can be handled as solid.

The polymerization reaction taking place in the microencapsulation process is an "in-situ interfacial polymerization reaction" because the polymerization of urea and formaldehyde takes place at the interface between the aqueous phase and the second dispersed phase of the 5E2N monomer healing-agent droplets.

The polymerization reaction between urea and formaldehyde at the interface between aqueous media and monomer healing-agent droplets produce the capsule shell. Depending on the urea and formaldehyde ratio, the copolymers attain different structures. For each batch of microencapsulation, the molar ratio of formaldehyde to urea is kept as 1:1.9.

The microencapsulation reaction takes place in a double jacket beaker. The beaker is linked to a thermostatic bath that permits the circulation of coolant at a controlled temperature. For this particular procedure, oil bath is used for heating the beaker to a set target temperature.

A mechanical stirrer driving a three-bladed low shear mixing propeller is placed inside the beaker. The desirable rotation speed is adjusted as a function of the size of the microcapsule to be produced.

The following points explain step-by-step procedure for the microencapsulation.

1) 125 ml of aqueous solution of ethyl methacrylate (EMA) at 0.5 Wt % is prepared by dissolving the copolymer powder in deionised water at 50° C. until initial white mixing becomes homogeneous and clear.
2) At room temperature, the EMA solution is poured into the 1000 ml suspended double jacketed beaker.
3) Under agitation at 550 rpm, 2.5 g urea, 0.25 g ammonium chloride and 0.25 g resorcinol are dissolved in the solution. The propeller is positioned right in the middle of the beaker to minimize size deviation of microcapsules.
4) At that time, the pH of the solution is around 2.6. To improve conditions of polymerization the pH is raised up to 3.5 with the help of NaOH and HCL.
5) One to two drops of 1-Octanol are added to eliminate surface bubbles.
6) Speed of the agitator is adjusted to 510 rpm to obtain desirable diameter of the microcapsules.
7) A slow stream of 30 ml of 5E2N is added to form an emulsion and the solution obtained is allowed to stabilize for 10 minutes.
8) Afterwards, 6.335 g of 37 wt % aqueous solution of formaldehyde is added to obtain 1:1.9 molar ratio of formaldehyde to urea.
9) Finally, the emulsion is covered and heated at a continuous rate to the target temperature of 55° C. The mixing is kept agitated continuously during 4 hours at the same temperature of 55° C. and then cooled to ambient temperature. A solution is obtained with microcapsules in suspension.

It is important that the microcapsules should have a similar diameter and get well dispersed in the matrix material. Agglomerated microcapsules do not fulfill this requirement as it creates capsule rich and capsule deficient areas in the matrix material.

An oil can be use to disperse the catalyst and to protect it from the aqueous layer. The oil can be, for example, a vegetal oil (such as peanut oil, sesame oil etc), a mineral oil (such as hydrocarbonated mineral oil, gas oil, and oil derived from charcoal or bituminous sand), a synthetic oil (such as polyalphaolefins (PAO), synthetic esters, polysiloxanes, etc.). Perfluorated solvents (such as perfluorocarbons FC-40, FC-72, Fluorinert™ series from 3M™; perfluoroamines (FC-70); perfluoroethers (for example C5-C18 mixture (CAS 86508-42-1), and derivatives thereof, can also be used to disperse the catalyst. Hydrophobic ionic liquids can also be used as an alternative to oils and perfluorated solvents.

A dispersion of the catalyst in a PDMS oil is successfully encapsulated in poly(formaldehyde urea) microcapsules by minor modification to the procedure used for the monomer healing-agent encapsulation. Several catalyst concentrations (in oil) have been investigated with success (refer to Table 1). The microcapsules have been formed with no apparent decomposition of the catalyst. The catalyst encapsulation was done following the procedure described concerning monomer healing-agent encapsulation.

Urea (2.25 g, 37.5 mmol, 100%), ammonium chloride (0.25 g) and resorcinol (0.25 g) is dissolved in an EMA aqueous solution (125 ml, 0.5%). The resulting solution is poured in a 1000 ml suspended double jacked reactor. The agitation is fixed at 510 rpm. At that time, the pH of the solution is adjusted from 2.6 to 3.5 by drop-wise addition of aqueous sodium hydroxide (NaOH) and/or hydrochloric acid (HCl). One to two drops of 1-octanol are added to eliminate surface bubbles. Then, 10 ml of the appropriate catalyst-PDMS suspension (different Grubbs catalyst loading were investigated for an organic layer volume of 10 ml: at concentrations 1, 6.67, 10 and 21 g L-1 of PDMS. In all cases the total encapsulation time was 5 hours (yield: ~74%)) is added slowly to form an emulsion and the solution obtained is allowed to stabilize for 10 minutes. An aqueous solution of formaldehyde (6.34 gr, 37 wt %, 78.2 mmol, 200%) is then added to the emulsion. The resulting white emulsion is covered and heated at a continuous rate to the target temperature of 55° C. during 5 h and is then cooled at ambient temperature and then filtered on a frit glass. The microcapsules are washed with water, acetone and diethyl ether (3 times, 30 ml portions) and air dried for 30 minutes to yield free-flowing microcapsules. These can be stored for several days as a suspension in deionised water, and filtered when needed.

TABLE 1

Encapsulation of the Grubbs' catalyst

| Exp | Catalyst loading (g/L) | microcapsules (mg) | % Catalyst | Remark |
|---|---|---|---|---|
| 1 | 1 | 6.76 | 0.09 | Compact |
| 2 | 6.6 | 8.63 | 0.61 | Free-flowing powder |
| 3 | 10 | 6.86 | 0.89 | Not completely free-flowing |
| 4 | 21 | 7.32 | 1.87 | Not completely free-flowing |

Figure 7:
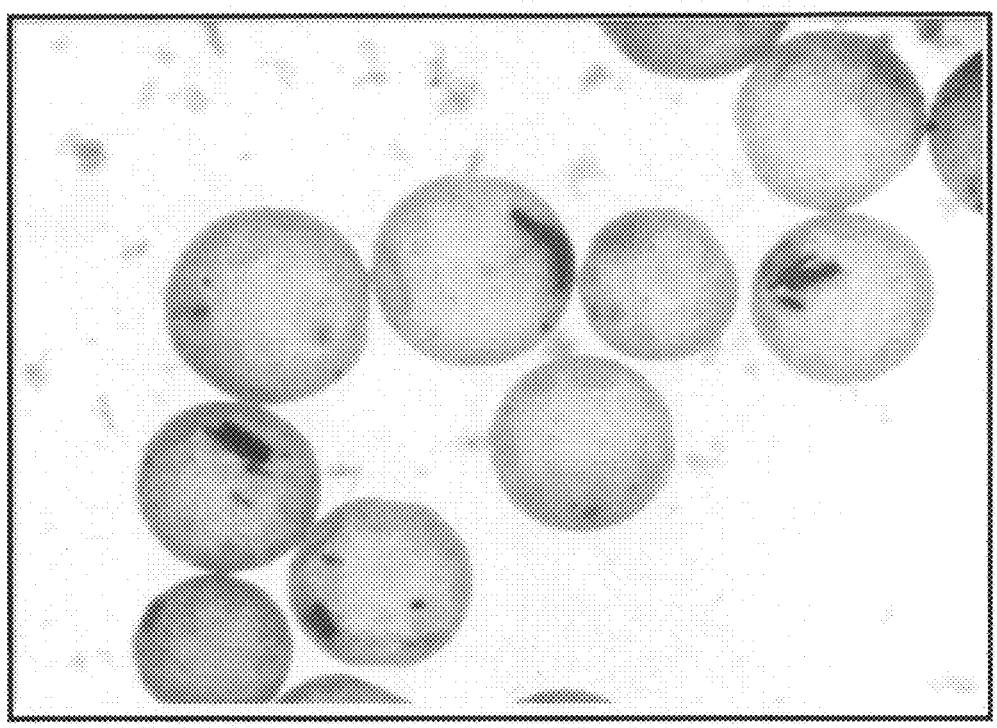
FIG. 7 is a picture of catalyst microcapsules in accordance with an embodiment of the present invention.
Figure 8:
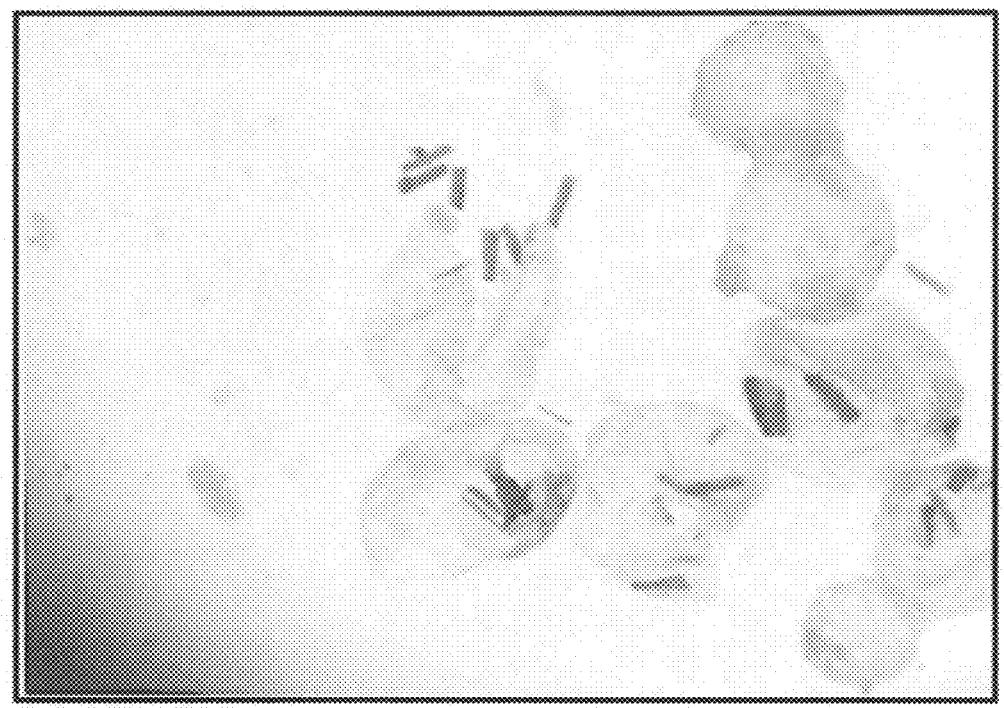
FIG. 8 is another picture of catalyst microcapsules in accordance with an embodiment of the present invention.

As shown in FIGS. 7 and 8, free-flowing microcapsules having a thicker shell have been produced. Some had a low catalyst load, which can be seen in most of them. More particularly, this can be observed under an optical microscope (X32). The catalyst is colored whereas all the rest is white or colourless. The catalyst is thus visible by transparency inside the microcapsules. Microscopic observation showed a homogeneous size distribution of the microcapsules. Their shell is strong enough to withstand minor damages and catalyst microcrystals are visible.

In order to verify that the catalyst was not decomposed during encapsulation, 5E2N polymerization experiments were carried out with the catalyst microcapsules. The experimental data is reported in Table 2.

TABLE 2

| Microcapsules (g) | Catalyst eq. (mg) | Monomer healing-agent (g) | Temperature (° C.) | Gel time (min) |
|---|---|---|---|---|
| 0.210 | 1.29 | 5.00 | 23.2 | 3.58 |
| 0.194 | 1.19 | 4.98 | 23.2 | 3.97 |

TABLE 2-continued

| Microcapsules (g) | Catalyst eq. (mg) | Monomer healing-agent (g) | Temperature (° C.) | Gel time (min) |
|---|---|---|---|---|
| 0.200 | 1.23 | 5.00 | 23.2 | 3.75 |
| 0.205 | 1.26 | 5.00 | 23.2 | 3.72 |

In each experiment, a gel time lower than 4 min at 20° C. was obtained. This indicates that the encapsulation does not deactivate the catalyst and that the PDMS oil does not seem to interfere during the polymerization. It is noteworthy to mention that the polymer obtained remained elastic, certainly because of the excess oil used here. In addition, the amount of PDMS encapsulated can be easily controlled by varying the catalyst/PDMS ratio.

Degassing Tests

The standard method for the sample preparation was followed for the preparation of probes containing monomer healing-agent microcapsules and a dispersion of the catalyst. To increase the homogeneity of the dispersion, acetone was used. Therefore a microcapsule suspension was mixed with the epoxy resin, resulting in a low viscosity mixture which was easily homogenized with the curing agent. The solvent was then removed under vacuum before pouring the mixture in the moulds.

Figure 9:
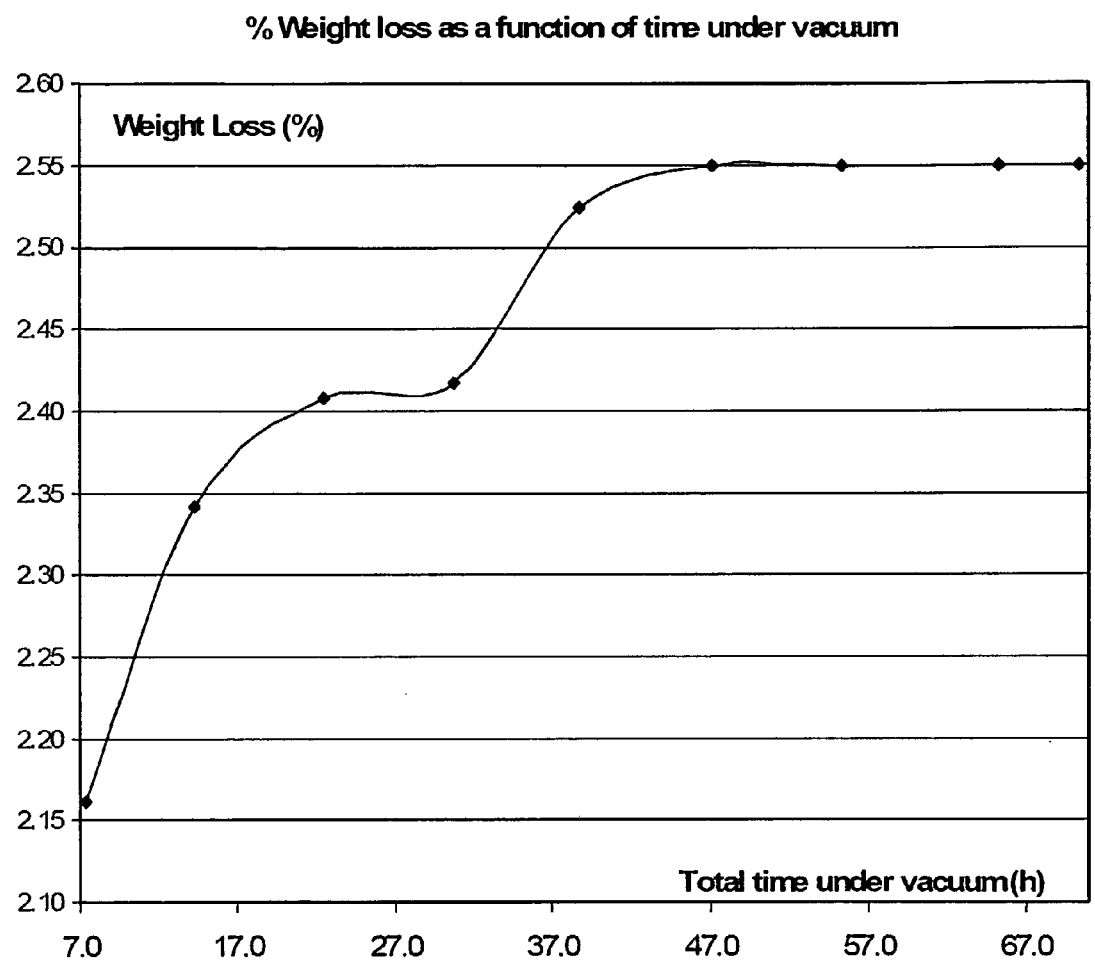
FIG. 9 is a curve representing the variation of the weight loss as a function of time under vacuum for microcapsules in accordance with an embodiment of the present invention.
Figure 10:
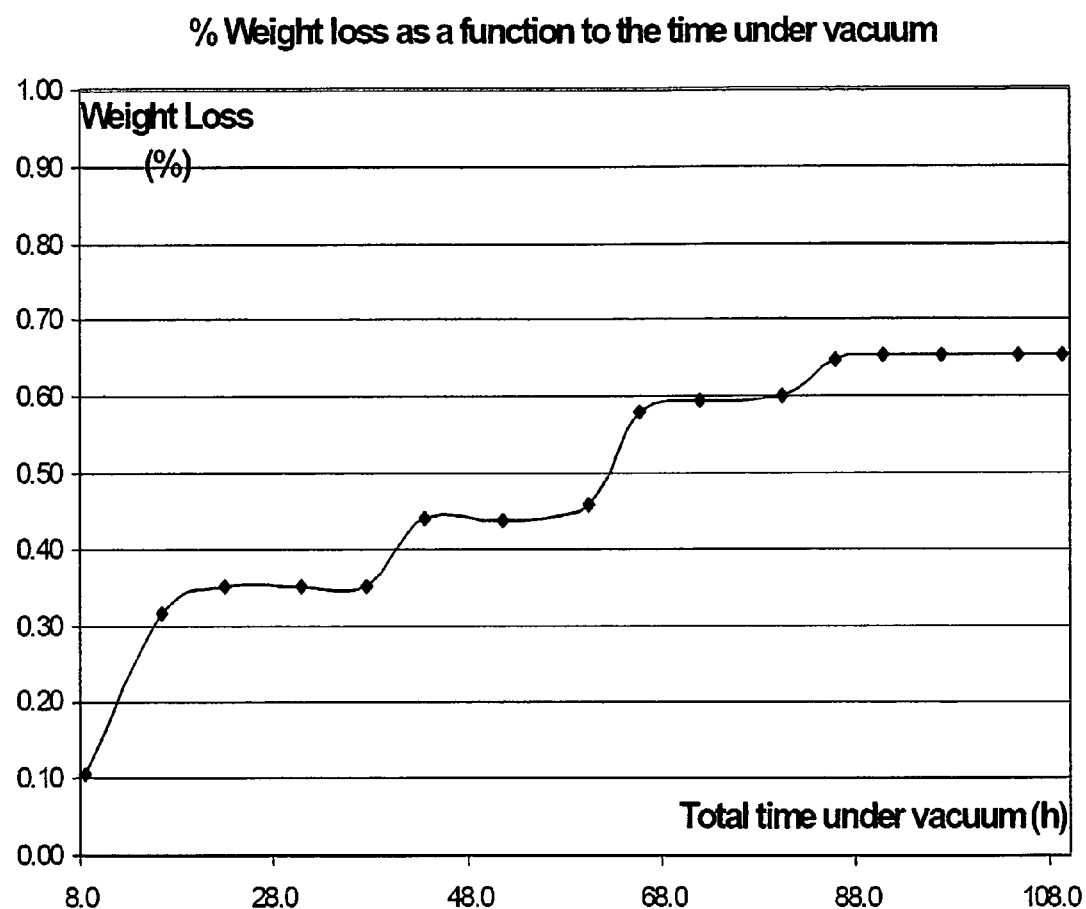
FIG. 10 is another curve representing the variation of the weight loss as a function of time under vacuum for microcapsules in accordance with an embodiment of the present invention.
Figure 11:
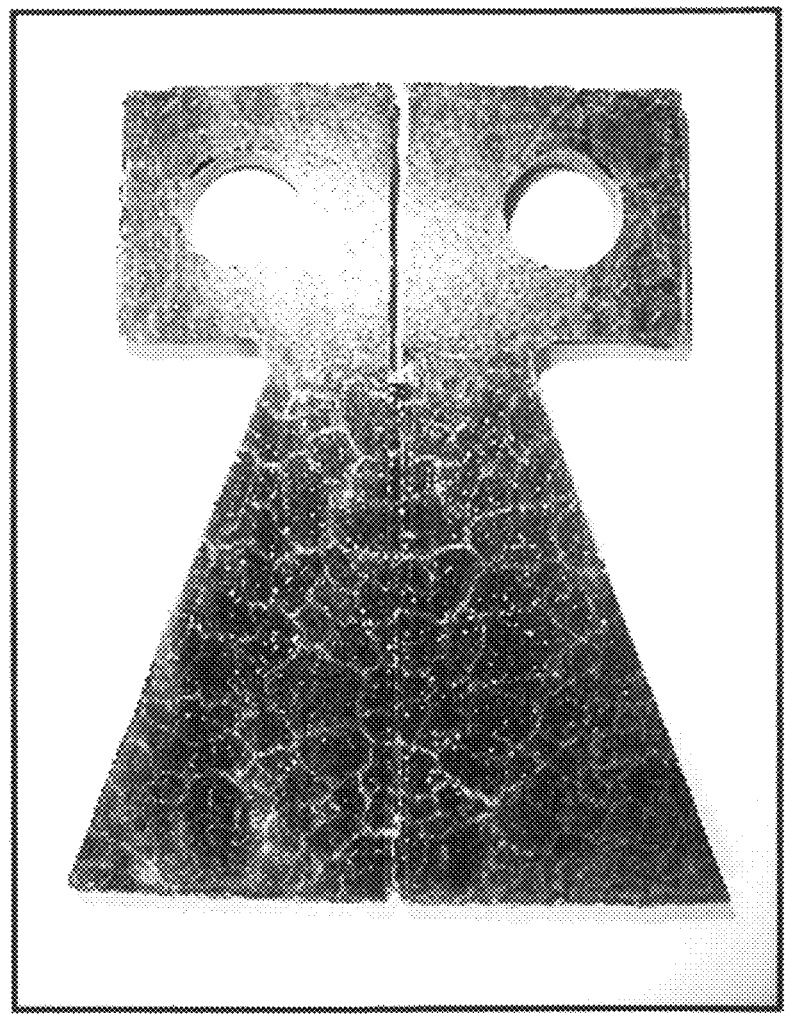
FIG. 11 is a picture of sample prepared in accordance with an embodiment of the present invention.
Figure 12:
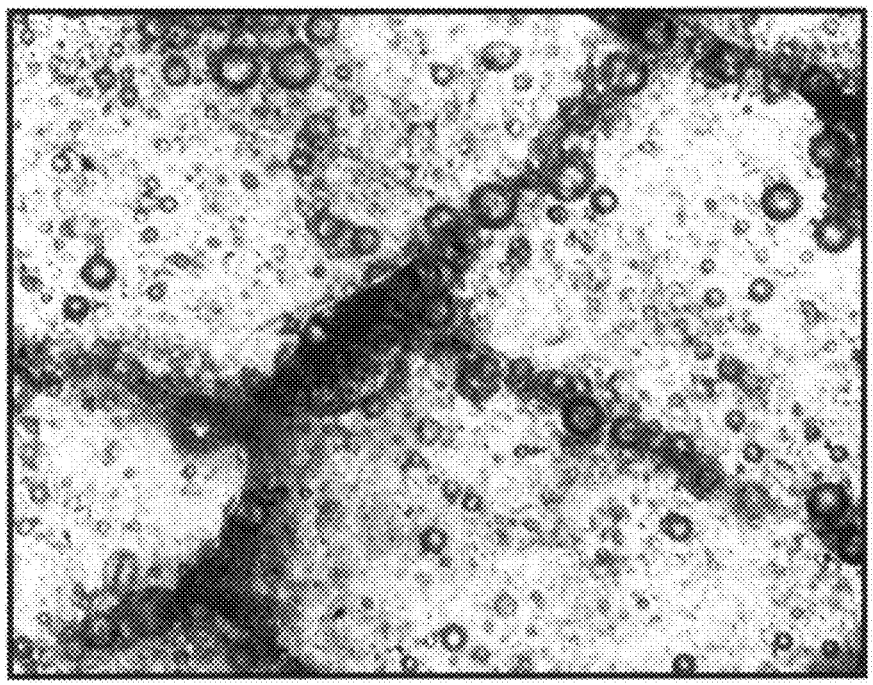
FIG. 12 is an enlarged view (24×) of another sample prepared in accordance with an embodiment of the present invention.

The out-gassing of two different samples (from two different batches made under the same protocol) was measured by placing a traction probe in a Schlenk under vacuum (10-2 mbar) for an extended period of time. Their degassing behavior is shown in FIGS. 9 and 10. In the resin of FIG. 9, a maximum weight loss of 2.55% wt is observed after almost 3 days. This might be due to a low homogeneity of the sample combined with a high quantity of microcapsules close to the surface (cf. the two bumps in the curve).

This value of weight loss is relatively low and indicates a minimal degassing of the monomer healing-agent from the material. In the second test shown in FIG. 10, a smaller weight loss of only 0.65% wt after 4 days under a vacuum of 10-2 mbar was observed. It can be noted that there are 4 consecutive weight losses that would suggest a better microcapsule distribution within the resin.

These tests confirm that the resin effectively traps the monomer healing-agent within the matrix. It is observed that there is no more weight loss once are incorporated in the resin while there is a 34% wt loss observed for non incorporated pure monomer healing-agent microcapsules.

EXPERIMENTAL TESTING

Composite material samples using 5E2N as the healing-agent were manufactured in order to be tested to determine their healing performance, which was benchmarked with that of composite material samples without healing-agent (called a neat sample). Both types of samples were tested either with, or without a crack. The stiffness value at crack site of the samples was used to comparatively measure their healing performance.

The healing performance of samples healed at 23° C. is explained here. The average stiffness of the neat and 5E2N samples without initial crack are 233 N/mm and 196 N/mm respectively. The average stiffness of the neat and 5E2N samples with initial crack and healed for one day are 114 N/mm and 154 N/mm respectively. In the presence of a crack, the stiffness of the neat sample is 49% of its original value. Similarly, the stiffness of healed 5E2N sample is 66% of the original value of the neat sample. These two values show that the recovery of the stiffness, in the case of the 5E2N sample, is caused by the healing process occurring at the crack plane.

Similar testing was conducted at 45° C., 60° C. and −20° C. in regular atmosphere and in vacuum. In all of these tests, the percentage of stiffness recovered in the case of the 5E2N samples is more than the percentage of stiffness recovered for the neat samples. In the case of the 5E2N samples, the healing-agent flowed in the crack plane. This binds the two crack faces together, increasing the stiffness of the sample. Neat samples, as expected, did not show this phenomenon. As such, healed 5E2N samples showed improvement in the recovery of the stiffness values as compared to neat samples.

Vacuum test results showed that the vacuum does not have any detrimental effect on the healing process. The polymerization reaction time between 5E2N and Grubbs' catalyst is fast enough so that before the 5E2N healing-agent flows out of the crack due to the vacuum, it becomes solid.

Samples were also subjected to thermal shock cycles. Many cracks were formed within the samples subjected to the thermal cycle. After 20 such thermal cycles, a neat sample broke into pieces. However, and despite having many cracks in the 5E2N sample, this latter remained in one piece. It may be concluded that the healing process is efficient and performs as expected. It may also be concluded that the 5E2N samples are better suited to the thermal cycles inherent to space applications.

Microscopic observations of fractured surface of the crack planes revealed that the 5E2N monomer healing-agent free-flowed into the crack plane and formed a polymerized thin film acting as bonding material between two crack faces. By comparison, the neat sample had shiny, smooth crack surfaces. At 23° C., a sample having prior art's DCPD healing-agent was also observed. The fractured crack surface was rough, with monomer healing-agent polymerized in spherical form. The crack propagation broke the microcapsule shells but the solid DCPD monomer inside the microcapsule shell did not flow into the crack plane to act as bonding material since the DCPD is solid at this temperature.

Self-Healing Composite Material in Space Environment

Space applications impose particular requirements on the self-healing composite material 1. The main factors of influence of a space environment on the polymerization process, and in particular for the self-healing process are:

High vacuum causing the evaporation of the healing agent 14.
Large temperature variation, requiring the process to be functional over a wide range of temperatures.
Space plasma (Atomic Oxygen, IR, UV and Radiation), which induces heating of the material, surface erosion and potentially chemical reactions (Atomic Oxygen).
Micro-meteorites and space debris that impact the self-healing composite material 1, creating craters.

Figure 13:
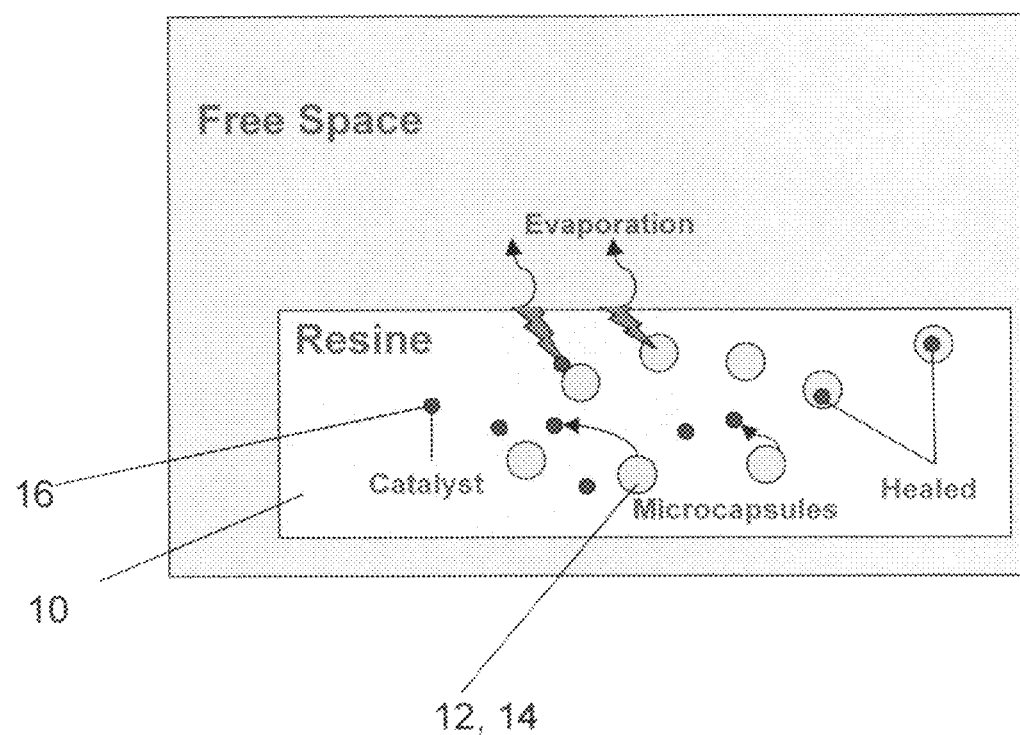
FIG. 13 is a simplified schematics of the competition between healing and evaporation.

Space vacuum induces a competition between the chemical reactions of polymerization and the evaporation of the healing agent 14. FIG. 13 schematically depicts this phenomenon where a piece of composite material 1 is placed in outer space 34. A developing crack 18 breaks neighboring microcapsules 12 and lets the healing agent 14 flow within the crack 18. The healing-agent 14 starts to react with the catalyst 16 to form a stable polymer and heal the matrix 10. However, simultaneously, the healing-agent 14 that is now in contact with the outer space 34 starts to evaporate at a given evaporation rate.

This competition is more complex at high and low temperatures. At low temperature, the evaporation rate of the monomer healing-agent 14 is slow, but at the same time, the healing activity is also very slow (hours). At high temperature, the evaporation rate is high, but at the same time the healing activity is also very fast (seconds). Hence, the resin of the matrix 10 embedding the microcapsules 12 with the healing-agent 14 is required to have a low evaporation rate (outgassing) in space environment. To heal the crack 18, the polymerization of the healing agent 14 must be faster than the evaporation rate.

Space Plasma Effects

For the self-healing process, the main effect of the space plasma is the surface erosion by Atomic Oxygen. The erosion of many epoxy resins were tested by the NASA, on the Long Duration Experiment Facility (LDEF), that stayed about six (5.8) years at orbit between 324 to 479 km with 28.5° inclination. The erosion depth caused by space plasma (mainly Atomic Oxygen) varied between 9 and 200 μm, depending on the type of resin used in the composite material samples and their position on the LDEF.

Once the shell 13 of a microcapsule 12 is eroded, the healing agent 14 will flow and protect the neighboring area. The healing capability is ensured since the maximum erosion depth is approximately the average diameter of a microcapsule 12. Space exposed microcapsules would not be totally eroded even in the worst case of maximum erosion.

The effects of the solar infra red (IR) and ultra violet (UV) rays are thought to be more beneficial, by slightly heating the material and increasing the healing activity rate.

Micrometeorites and Space Debris

Space missions and satellite operations have created a large number of man-made space debris (on-orbit fragmentations), in addition to the naturally occurring micrometeorites.

The characterization of these impacts on a spacecraft is an important element of its environmental risk analysis. The diameter size of the impact craters depends on the debris mass and velocity.

The distribution of the craters diameter size can be deduced from empirical damage equations, as well as from data gathered during space missions. Experimentally measured distribution from both the LDEF space exposed surfaces and from the solar cells of the MIR space station are similar. The summary of their distribution, taken as example, is presented in Table 3. Table 4 presents the distribution details. The MIR space station stayed for about eleven (11) years on an orbit between 151 to 215 km with 51.6° inclination.

More than 80% of crater damages (diameter<1 mm) can be healed with the proposed system since the microcapsule diameter is between 100 μm and 400 μm

TABLE 3

Summary of Impact Crater Size Distribution for LDEF and for MIR space station

| | Debris Diameter | | | |
|---|---|---|---|---|
| | 1-100 μm | 100-300 μm | 0.3-1 mm | 1-5 mm |
| Fraction of Surface affected | $1 \times 10^{-4}$ | $0.5 \times 10^{-4}$ | $3 \times 10^{-4}$ | $1 \times 10^{-4}$ |

TABLE 4

Details of Impact Crater Size Distribution for LDEF and MIR space station

| Impact Diameter (mm) | Number of craters LDEF (5.8 years) | Number of craters MIR (11 years) |
|---|---|---|
| <0.1 | 688 | 133 |
| 0.1-0.5 | 829 | 292 |
| 0.6 | 629 | 69 |
| 0.7 | 548 | 61 |
| 0.8 | 352 | 48 |
| 0.9 | 178 | 38 |
| 1.0 | 171 | 32 |
| 1.1 | 104 | 26 |
| 1.2 | 76 | 18 |
| 1.3 | 56 | 16 |
| 1.4 | 32 | 15 |
| 1.5 | 41 | 12 |
| 1.6 | 26 | 11 |
| 1.7 | 16 | 10 |
| 1.8-2.5 | 38 | 7 |
| >2.5 | 27 | 3 |

Demonstrated Tests of the Self-Healing Process

Table 5 summarizes the test performed for space applications and their related objectives.

| Objective | Demonstration of self-healing in devices |
|---|---|
| Complete Autonomy | Self-triggered and good performance demonstrated |
| Large healing temperature range | Feasible between (−80° C. to +146° C.), Tested between (−20° C. and +60° C.) in normal atmosphere (the high temperature limited by the resin melting (>85° C.) |
| Compatibility with space vacuum | Healing demonstrated in vacuum ($10^{-6}$ mbar) at 23° C. and 75° C. |
| Healing activity time | Fast polymerization demonstrated <150 minutes at −20° C. (compared to 24 hours for a GEO satellite cycle and about 150 minutes for LEO-satellite cycle) <5 minutes at room temperature < a few seconds at 60° C. |
| Healing in harsh environment (Resistance to shocks, vibration and accelerated aging) | The thermal shock test (−195° C. to +60° C., 20 cycles) demonstrated that the healing was autonomous and effective to repair cracks developed randomly by the stresses in very harsh environment. The healing microcapsules are acting also as shock absorber and assist to damp the shock effect on the resin structure. (See FIG. 14 for the test results and Table 6 for test details) |

TABLE 6

Comparison between the thermal shock required by MIL-STD 883 and the test applied to the self-healing material.

| Parameter | MIL-STD-883 | Self-healing device test |
|---|---|---|
| Low temperature | −135° C. | −195° C. (Liquid Nitrogen) |
| High temperature | 150° C. | 60° C. (Resin can melt for T >85° C.) |
| Dwell time at each extreme | 10 minutes | 10 minutes |
| Time between low and high temperature | <1 minute | <1 minute |
| Number of cycles | 10 cycles | 20 cycles |

Figure 14:
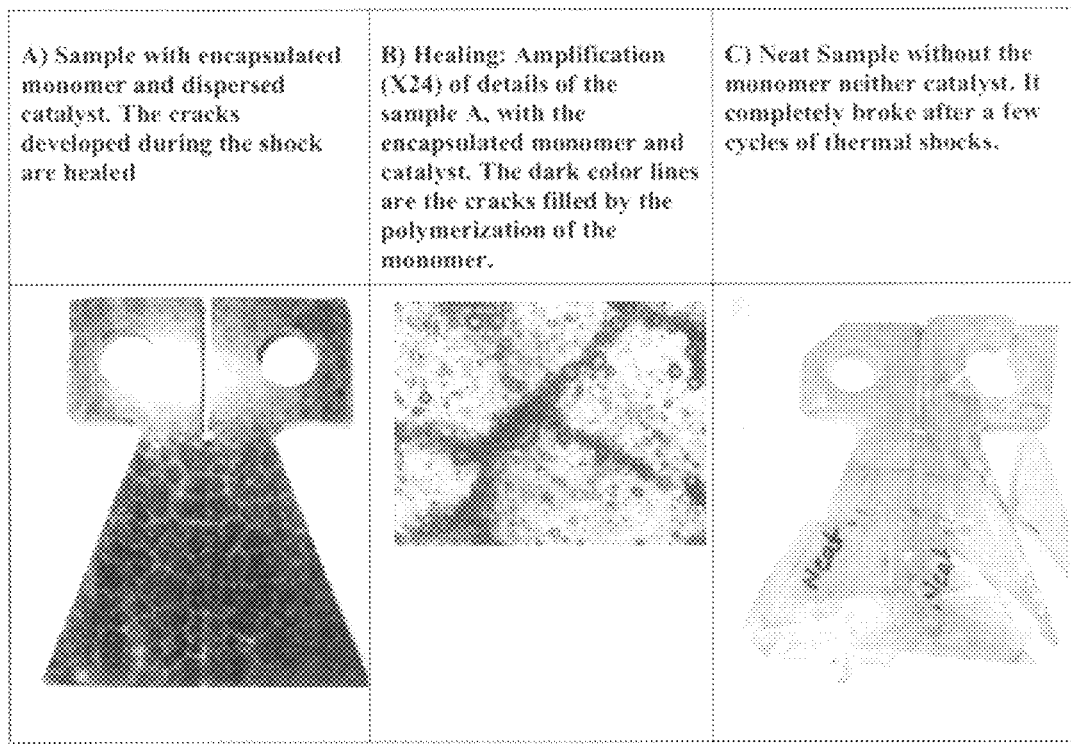
FIGS. 14A to 14C represent a table of the results of the self-healing process during a thermal shock test.

FIG. 14 shows the results of the self-healing process during a thermal shock test.

Space Degradation Processes and Self-Healing Capabilities

Table 7 summarizes the self-healing capability of the developed technology as a function of space degradation processes.

| Degradation Process | Effects | Self-healing applications |
|---|---|---|
| Micrometeorites and debris | Pinholes and craters | Heals small punctures of diameter up to 1 mm For large cracks, the monomer healing-agent within microcapsules may heal a small width defect |
| Temperature swings (−50° C. to +80° C.) | Deformation and cracks developed by thermal fatigue | The cracks due to these cycles develop very slowly leaving enough time to heal. |
| Shock and vibration during the launch | Development of mechanical stresses and cracks | Self-healing repairs cracks developed by vibration and probably those developed by the shock The autonomous healing was demonstrated in the thermal shock test (−195° C. and +60° C.) |
| Structures Aging | Development of cracks or deformation of structure parts under load and stress | Can repair the cracks Can stop the deformation when the microcapsules break, the monomer healing-agent flows and reacts with the catalyst making the structure stronger |
| Evaporation in Vacuum | Mass loss | Low The resin structure tested has very low out-gassing rates The healing reaction is very fast |
| UV and IR Photonic fluxes | Mechanical degradation/ Development of cracks | The UV and IR fluxes may assist the healing activation to repair the cracks |

| Degradation Process | Effects | Self-healing applications |
|---|---|---|
| Space plasma Atomic Oxygen and radiations | Erosion, oxidation | Erosion breaks the microcapsules and permits the healing of the surface |

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description.

We claim:

1. A self-healing material comprising a matrix including:
   micropockets containing a healing-agent, said healing agent comprising 5-ethylidene-2-norbornene; and
   microcapsules containing a liquid that is a PDMS oil, and mixtures thereof, and a catalyst dissolved or dispersed in the liquid and allowing the polymerization of the healing agent, said liquid being effective for protecting said catalyst from water and said liquid being effective for not interfering during the polymerization of the healing agent, said micropockets and said microcapsules being uniformly distributed and embedded in the matrix,
   being understood that when a crack is made in the matrix, at least one micropocket of the set of micropockets and one microcapsule of the set of microcapsules are broken to release and mix their content in the crack and thereby allow the polymerization of the healing agent <<in situ>> into a solid polymer that is bonded to the matrix and fills the crack to repair it.

2. A self-healing material comprising a matrix comprising at least one polymer material, said matrix further comprising:
   a first set of microcapsules containing a healing-agent, said healing agent comprising 5-ethylidene-2-norbornene; and
   a second set of microcapsules containing a liquid that is a PDMS oil, and a catalyst dissolved or dispersed in the liquid and allowing the polymerization of the healing agent, said liquid being effective for protecting said catalyst from water and said liquid being effective for not interfering during the polymerization,
   said microcapsules of said first set and said second set being uniformly distributed and embedded in the matrix,
   being understood that when a crack is made in the matrix, at least one microcapsule of the first set of microcapsules and one microcapsule of the second set of microcapsules are broken to release and mix their content in the crack and thereby allow the polymerization of the healing agent <<in situ>> into a solid polymer that is bonded to the matrix and fills the crack to repair it.

3. The material of claim 2 wherein said healing-agent has a boiling point above 130° C. and a melting point below −50° C.

4. The material of claim 3 wherein said healing-agent has a boiling point above 144° C.

5. The material of claim 2 wherein said healing-agent is 5-ethylidene-2-norbornene.

6. The material of claim 2 wherein said material is a fiber reinforced composite material.

7. The material of claim 2 wherein microcapsules of the second set of microcapsules have a shell comprising poly ureaformaldehyde.

8. The material of claim 2 wherein said healing-agent has a curing time of less than 10 minutes at 40° C.

9. The material of claim 2 wherein said catalyst is a catalyst adapted to catalyze a ring opening metathesis polymerization reaction.

10. The material of claim 2 wherein said material further comprises a third set of microcapsules comprising a liquid healing agent different from the healing agent of the first set of microcapsules, and wherein the healing agent of the first set of microcapsules has a melting point different than the melting point of the healing-agent of the third set of microcapsules, said microcapsules of the third set of microcapsules being uniformly distributed and embedded in the matrix.

11. The material of claim 1, wherein the healing-agent boils only above an operational temperature range of said material, but is solid at lower end of said operational temperature range.

12. The material of claim 2, wherein said material is operative to perform self-healing at least daily in space orbit.

13. The material of claim 1 wherein said healing-agent is 5-ethylidene-2-norbornene.

14. The material of claim 1 wherein microcapsules of the second set of microcapsules have a shell comprising poly ureaformaldehyde.

15. A self-healing material comprising a matrix comprising at least one polymer material, said matrix further comprising:
   a first set of microcapsules containing a healing-agent, said healing agent comprising 5-ethylidene-2-norbornene; and
   a second set of microcapsules containing a polysiloxane and a catalyst dissolved or dispersed in the polysiloxane and allowing the polymerization of the healing agent, said polysiloxane being effective for protecting said catalyst from water and said polysiloxane being effective for not interfering during the polymerization,
   said microcapsules of said first set and said second set being uniformly distributed and embedded in the matrix,
   being understood that when a crack is made in the matrix, at least one microcapsule of the first set of microcapsules and one microcapsule of the second set of microcapsules are broken to release and mix their content in the crack and thereby allow the polymerization of the healing agent <<in situ>> into a solid polymer that is bonded to the matrix and fills the crack to repair it,
   wherein said polysiloxane is PDMS oil.

* * * * *